Oct. 9, 1923.
J. A. BRIED
VELOCIPEDE DRIVING PART
Filed May 17, 1922
1,469,884
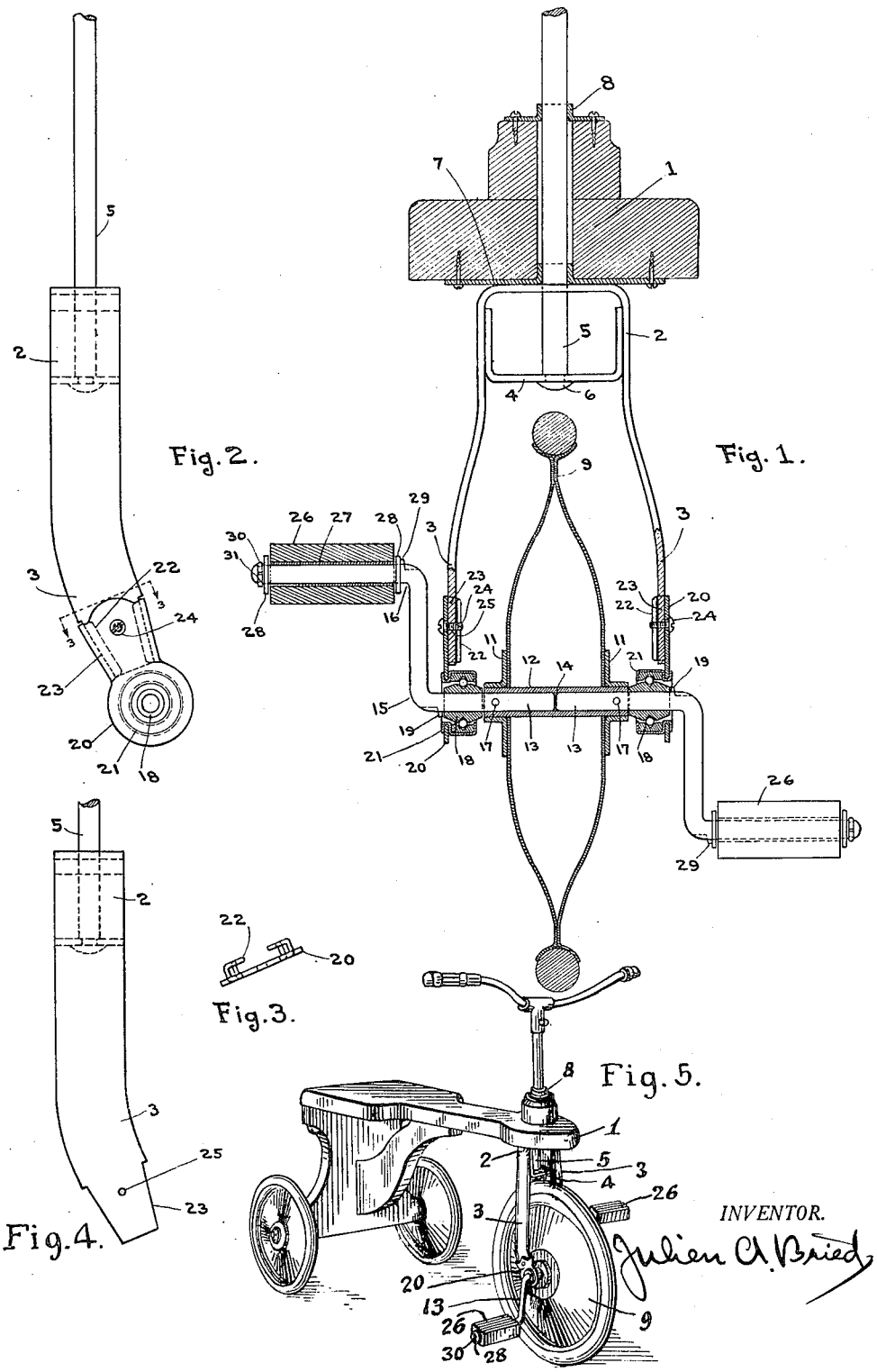
INVENTOR.
Julien A. Bried Patented Oct. 9, 1923.

1,469,884

UNITED STATES PATENT OFFICE.

JULIEN A. BRIED, OF OAKLAND, CALIFORNIA, ASSIGNOR TO H. C. WHITE COMPANY, OF NORTH BENNINGTON, VERMONT, A CORPORATION OF VERMONT.

VELOCIPEDE DRIVING PART.

Application filed May 17, 1922. Serial No. 561,754.

*To all whom it may concern:*

Be it known that I, JULIEN A. BRIED, a citizen of the United States, residing at Oakland, in the county of Alameda and State of California, have invented a new and useful Improvement in Velocipede Driving Parts, of which the following is a specification and which is illustrated in the accompanying drawings.

This invention relates to small velocipedes as used by children and particularly to the construction of the front fork and pedal driving parts connecting the front or driving wheel.

It has for its principal objects, improved construction of these parts, overcoming the usual play between driving crank shafts and wheel, promoting ease of assembly and avoiding any projecting parts which would be liable to scratch or injure a rider's shoes or clothing.

These several objects are attained in the construction shown in the accompanying drawings in which Figure 1 shows in partial vertical cross section the front fork, driving wheel, pedals and crank shafts of a child's velocipede. Figure 2 shows a side view of one side of the fork and its detachable end. Figure 3 shows an end view of one detachable end, looking down from the dotted line 3—3 of Figure 2. Figure 4 shows the shape of the fork extremity with the detachable end removed.

Figure 5 shows in reduced scale, a perspective view of a complete, child's velocipede embracing my improved driving parts.

In Figure 1, the body or steering head of the velocipede is designated 1 and the front fork 2.

The fork 2 is of one piece bent around to form two sides 3—3 and is transversely braced on top by the bridge member 4 welded to it and to which a steering post 5 is riveted at 6.

The steering post passes upward through the body 1 of the velocipede, being supported in lower and upper bearing plates respectively 7 and 8, so that it is free to turn for steering the driving wheel 9.

The driving wheel 9 shown in section, is of the double disc welded type, and has two hubs 11 welded or otherwise secured to the disc sides. A tube 12 passes entirely through the wheel and hubs 11 and receives the ends 13—13 of the pedal crank shafts.

The crank shafts 13 of each pedal are duplicates terminating at 14 in the center of the tube. They are of round iron and have two approximately right angle bends 15 and 16 (a common form of construction) to form the crank.

The shafts are firmly pressed into the tubular hub of the wheel and permanently riveted in place at 17 by rivets passing through both tube and hubs.

Before riveting to the wheel, however, a bearing 18, here shown as a ball bearing, is slipped over each shaft. The bearings are held in position on the shaft against the hub by a small stop 19 formed on the shaft at the bend.

The bearings 18 are secured to detachable fork ends 20 by means of ferrules 21 crimped over both bearing and fork ends so that they form an inseparable assembling unit.

The detachable fork ends 20 are formed with tapered overlapping sides 22 to fit over and embrace the tapered ends 23 of the lower extremities of the forks, the shape of the latter being shown clearly in Figure 4.

The general form of the detachable fork ends 20 is shown in Figure 2, a side view of the fork only with a detachable end in position. Figure 3 shows the end view of the detachable end shown in Figure 2 but with the bearing omitted.

The detachable ends carrying the bearings will thus be seen to slip over the ends of the fork and seat tightly along the tapered edges with their overlapping edges 22 locked around the edges of the tapered fork ends. The weight of a rider on the vehicle serves to keep the detachable ends forced up on the tapered fork ends tightly in place.

To prevent possible loosening of the detachable ends a small screw 24 is passed through each detachable end and screwed into a threaded hole 25 in the fork ends. The hole in the detachable end through which the screw passes is made loose or slotted so the parts will be free to seat themselves and not be limited by the screw.

On the outer end of the crank shaft is mounted a rotatable pedal 26, usually of rubber with a metal bushing 27 passing through it. This pedal is positioned on the shaft between two washers 28. The inner washer bearing against another stop 29 formed on the crank shaft and the outer one against a wire split ring 30 sprung into a groove 31 formed in the extreme end of the shaft.

Figure 5 shows in a reduced scale, a perspective view of a small velocipede fitted with my improved driving construction, with the principal parts numbered as given.

The construction above described in detail while similar in some respects to existing designs is quite different at several important points. It will be noted that the wheel, cranks, and bearings crimped into the loose fork ends, are a permanent inseparable assembly which may be readily removed for replacing of worn tires on the wheel, but on which there is nothing to lose or get shaky through use.

Earlier constructions simulating this have necessitated loosely fitting cranks in the wheel held by cotters or removable pins, such construction always developed so much wobble and play to the cranks and wheel as to impair the vehicle's usefulness, whereas in applicant's device the cranks are forced under power into the wheel and firmly riveted, for on account of the detachable fork ends, they do not have to come out to remove the wheel from the vehicle.

I claim:

1. In a velocipede, a driving wheel of the disk type comprising two centrally spaced sheet metal side disks secured together near the outer edges, two outwardly flanged hubs secured one to each disk, a spacing tube centrally disposed within the wheel, two driving crank shafts extending respectively into said tube from opposite ends thereof, and means passing through the flanges of said hubs and said crank shafts for securing the shafts in place.

2. In a velocipede driving wheel—hubs on both sides of said wheel, a tube passing through said wheel and into said hubs driving crank shafts extending into said tube from both ends, each riveted through said tube and one of said hubs.

3. In a velocipede driving wheel—hubs on both sides of said wheel, a tube passing through said wheel and into said hubs, driving crank shafts extending into said tube from both ends, each riveted through said tube and one of said hubs, a bearing on each crank shaft outside of said hubs, and a stop on each crank shaft for positioning the bearing.

4. In a velocipede driving wheel, a shaft of uniform diameter extending into the wheel and secured thereto, said shaft being bent at substantially right angles to form a driving crank and again bent to form a pedal shaft, a pedal mounted for rotation on said pedal shaft, a lug formed on the shaft at the latter bend to locate the inner end of the pedal, a groove formed around the shaft beyond the outer end of the pedal and a retaining ring in said groove accessible without the pedal for manipulation.

5. In a velocipede front fork, detachable ends therefor formed to slide longitudinally each over one end respectively of said fork in overlapping engagement therewith, a ball bearing for the front axle at each detachable end and a ferrule locking the bearing to the detachable end.

6. In a velocipede, a front fork having its free ends terminating each in a taper, detachable ends formed to slide each respectively over a fork end in locking engagement with the taper, a ball bearing for the front axle at each detachable end, and a ferrule for each locking the bearing to the detachable end.

7. In a velocipede front fork, a ball bearing, a ferrule embracing the edge of said bearing, a hole in the end of said fork, said ferrule passing into said hole, and being turned over against the fork end to tie the bearing to said fork end.

8. In a velocipede, a front fork having its free ends terminating in a taper, detachable ends formed to slide longitudinally each respectively over a tapered fork end and to overlap both edges and engage both sides thereof.

9. In a velocipede, a front fork having its free ends terminating in a taper, detachable ends formed to slide longitudinally each respectively over a tapered fork end and to overlap both edges and engage both sides thereof, said detachable ends being endwise removable only and provided with means for holding them against such removal.

10. In a velocipede front fork construction, bearing supporting detachable ends formed to interlock with the lower ends of the fork and adapted to wedge upwardly and tighten in place through the weight of a rider on the velocipede.

JULIEN A. BRIED.